United States Patent
Harada et al.

(10) Patent No.: US 6,853,466 B1
(45) Date of Patent: Feb. 8, 2005

(54) IMAGE PROCESSING APPARATUS AND METHOD

(75) Inventors: Takuto Harada, Kanagawa (JP); Joji Oki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 09/718,363

(22) Filed: Nov. 24, 2000

(30) Foreign Application Priority Data

Nov. 24, 1999 (JP) .............................................. 11-333275
Apr. 14, 2000 (JP) ....................................... 2000-114180

(51) Int. Cl.$^7$ ................................................. G06K 9/36
(52) U.S. Cl. ........................ 358/1.9; 382/232; 382/239; 382/173
(58) Field of Search .......................... 358/1.9; 382/232, 382/233, 239, 243, 173

(56) References Cited

U.S. PATENT DOCUMENTS 6,014,464 A * 1/2000 Kurzweil et al. ........... 382/233
6,483,609 B1 * 11/2002 Ueno et al. ................. 358/434

* cited by examiner

*Primary Examiner*—Thomas D. Lee
(74) *Attorney, Agent, or Firm*—Fitzpatrick, Cella, Harper & Scinto

(57) ABSTRACT

An image region is designated based upon object information possessed by image information and the designated image region is subjected to encoding that is different from that of other regions, thereby making it possible to raise the encoding efficiency of the overall image. Specifically, a drawing object is discriminated based upon object information that accompanies the drawing object, the drawing object is developed and rendered as an image, and a prescribed image region of the image is designated based upon object information that corresponds to the drawing object that has been developed and rendered. After the bits of image data of the prescribed image region have been shifted up, the image data of the prescribed image region and image data other than the prescribed image region are encoded at different compression ratio, respectively.

16 Claims, 20 Drawing Sheets

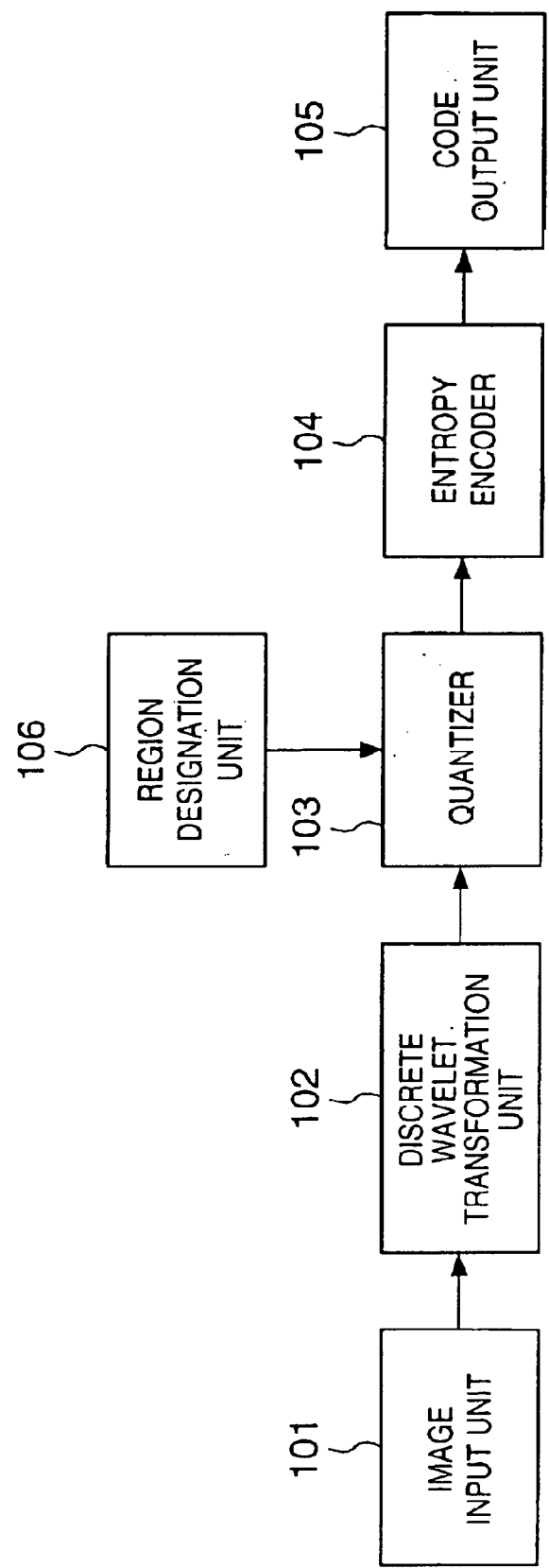

FIG. 2A
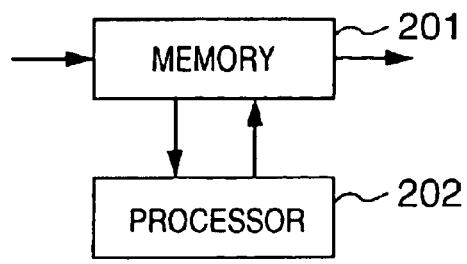
FIG. 2B
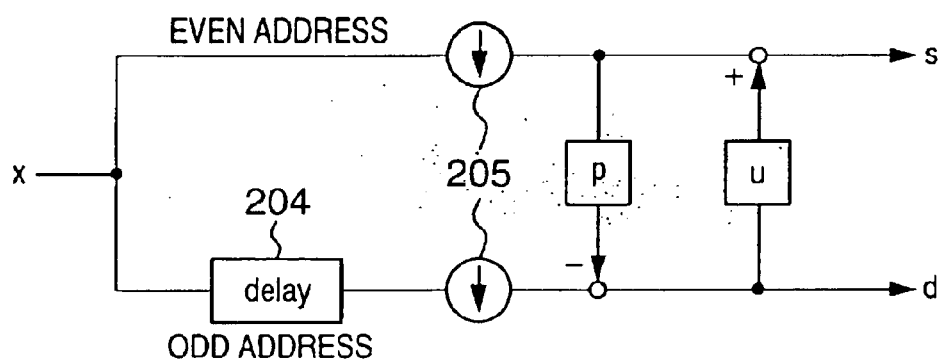
FIG. 2C
| LL | HL2 | HL1 |
|----|-----|-----|
| LH2 | HH2 | |
| LH1 | | HH1 |

FIG. 5A

| MH | TH0 | BS0 | TH1 | BS1 | ------- | THn−1 | BSn−1 |

FIG. 5B

| IMAGE SIZE | TILE SIZE | NUMBER OF COMPONENTS | COMPONENT INFORMATION |

FIG. 5C

| TILE LENGTH | ENCODING PARAMETER | MASK INFORMATION | BIT-SHIFT INFORMATION |

FIG. 5D

| LL | HL2 | LH2 | HH2 | HL1 | LH1 | HH1 |

| BIT PLANE S-1 | BIT PLANE S-2 | ---------- | BIT PLANE 0 |

F I G. 10A

| MH | TH0 | BS0 | TH1 | BS1 | ...... | THn-1 | BSn-1 |

F I G. 10B

| IMAGE SIZE | TILE SIZE | NUMBER OF COMPONENTS | COMPONENT INFORMATION |

F I G. 10C

| TILE LENGTH | ENCODING PARAMETER | MASK INFORMATION | BIT-SHIFT INFORMATION |

F I G. 10D

| LL | HL2 | LH2 | LL | ---- | LL | HL2 | LH2 | HH2 | HL1 | LH1 | HH1 |

BIT PLANE S-1    BIT PLANE S-2    BIT PLANE 0

FIG. 13

| BIT 0<br>(BITMAP FLAG) | BIT 1<br>(COLOR FLAG) | BIT 2<br>(CHARACTER FLAG) | |
|---|---|---|---|
| 0 (BITMAP)<br>1 (VECTOR) | 0 (COLOR)<br>1 (MONOCHROME) | 0 (OTHER THAN CHARACTER)<br>1 (CHARACTER) | BITMAP FLAG = 0 |
| | | 0 (GRAYSCALE PRIORITY)<br>1 (RESOLUTION PRIORITY) | BITMAP FLAG = 1 |

FIG. 15

| COMBINED OBJECTS | SI / NOT SI | DI / NOT DI | SI OR DI | SI AND DI | SI XOR DI | SI α DI |
|---|---|---|---|---|---|---|
| FLAG COMBINING METHOD | SI FLAG ← 1501 | DI FLAG ← 1502 | | ALL 0s IF SI AND DI ARE DIFFERENT SI FLAG IF SI AND DI ARE IDENTICAL ← 1503 | | |

FIG. 20A
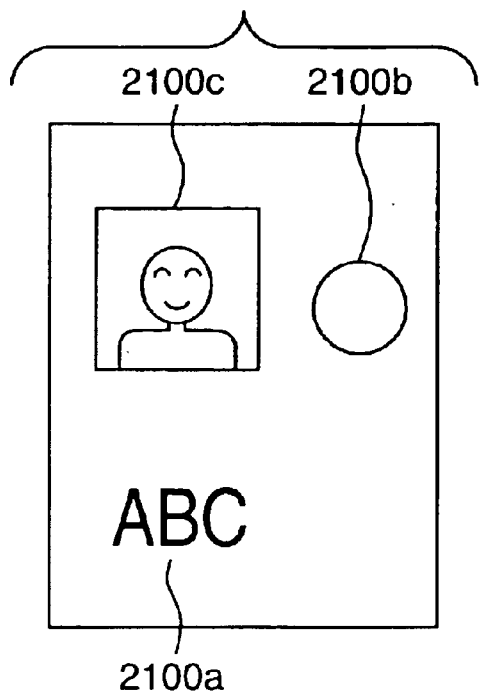
2100c  2100b
2100a
FIG. 20B
OBJECT 1
  TYPE = CHAR
  x, y FONTNAME SIZE CODE = a, COLOR
  x, y FONTNAME SIZE CODE = b, COLOR
  x, y FONTNAME SIZE CODE = c, COLOR
OBJECT 2
  TYPE = GRAPHIC
  x, y r CIRCLE, COLOR
OBJECT 3
  TYPE = IMAGE
  x, y, w, h, IMAGE POINTER
FIG. 20C
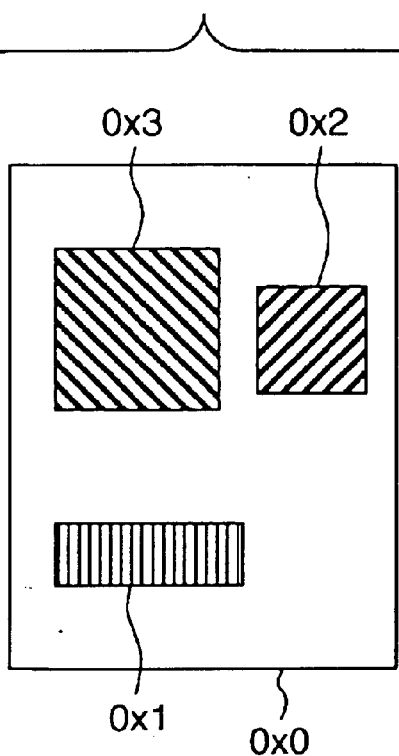
0x3  0x2
0x1  0x0

IMAGE PROCESSING APPARATUS AND METHOD

FIELD OF THE INVENTION

This invention relates to an image processing apparatus and method for encoding image data having object information such as attribute information.

BACKGROUND OF THE INVENTION

In general, image information possesses object information, which indicates attributes, etc., of the image, as bit information, and the object information is used as important information when this image information is developed and rendered.

When image information is encoded, it is desired that the information be encoded in conformance with the image characteristics specified by attribute information, etc., possessed by this image information. When image information is encoded, therefore, an image region having certain characteristics within the image is designated and an attempt is made to encode this region using a technique that is different from that applied to other regions. In order to designate such a region, however, the designation is made manually or the region is fixed to one that has been predetermined.

Conventionally, in a printing apparatus capable of printing a bitmapped image the basis of an input print instruction, generating attribute information about the bitmapped image by using the print instruction and attribute information of the print instruction, compressing/decompressing the bitmapped image, and outputting the bitmapped image, a single compressing/decompression parameter is set for the overall bitmapped image.

Even if a compression/decompression parameter can be set for a part of a bitmapped image, compression/decompression parameters are only switched in accordance with a target area instruction from a user, but the attribute information of the bitmapped image which is generated by using the print instruction and the attribute information of the print instruction is not used.

Owing to requirements for higher image quality, higher resolution, and the like, no attempt has been made to variably set compression/decompression parameters for a predetermined portion of a bitmapped image or perform efficient compression/decompression parameter control using attribute information.

SUMMARY OF THE INVENTION

An object of the present invention is to provide an image processing apparatus and method for designating an image region based upon object information possessed by image information and subjecting the designated image region to encoding different from that of other regions, whereby encoding efficiency of the overall image is improved.

Another object of the present invention is to provide a printing apparatus which can effectively control parameter settings associated with image processing and effectively and efficiently print images while maintaining high image quality, a control method therefor, and a computer-readable memory.

According to the present invention, the foregoing object is attained by providing an image processing apparatus comprising: discrimination means for discriminating a drawing object based upon object information corresponding to the drawing object; developing means for developing the drawing object and obtaining developed image data which represents a developed image; designation means for designating a region of the developed image based upon the object information corresponding to the drawing object that has been developed by said developing means; shift-up means for shifting up the bits of image data corresponding to the region of the developed image: and encoding means for entropy encoding the developed image data, in which the bits of the image data have been shifted up by said shift-up means.

Further, according to the present invention, the foregoing object is attained by providing an image processing method comprising: a discrimination step of discriminating a drawing object based upon object information corresponding to the drawing object; an developing step of developing the drawing object and obtaining developed image data which represents developed image; a designation step of designating a region of the developed image based upon the object information corresponding to the drawing object that has been developed by said expansion step; shift-up step of shifting up the bits of image data corresponding to the region of the developed image: and an encoding step of entropy encoding the developed image data, in which the bits of the image data have been shifted up by said shift-up step.

In a preferred aspect of the invention, the drawing object may be created based on a PDL data, and the object information may include an attribute information (such as a type of object and color and the like) of the drawing object.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram illustrating the construction of an image encoding apparatus according to an embodiment of the present invention;

FIG. 2A is a diagram for describing the general construction of a wavelet transformation unit according to this embodiment;

FIG. 2B is a diagram for describing the functional performance of a wavelet transformation unit according to this embodiment;

FIG. 2C is a diagram for describing subbands obtained by a transformation performed by a wavelet transformation unit according to this embodiment;

FIG. 5A is a schematic view which represents the structure of a code sequence generated and outputted by spatial scalability;

FIG. 5B is a schematic view which represents the structure of a main header generated and outputted by spatial scalability;

FIG. 5C is a schematic view which represents the structure of a tile header generated and outputted by spatial scalability;

FIG. 5D is a schematic view which represents the structure of a bit stream generated and outputted by spatial scalability;

FIG. 10A is a diagram for describing an example of a structure of an overall code sequence in case of SNR scalability;

FIG. 10B is a diagram for describing an example of a main header of a code sequence in case of SNR scalability;

FIG. 10C is a diagram for describing an example of a title header of code sequence in case of SNR scalability;

FIG. 10D is a diagram for in describing the sturucture of a bit stream in case of SNR scalability;

FIG. 13 is a diagram for describing the structure of 3-bit information according to this embodiment;

FIG. 15 is a diagram for describing combinations of objects and a flag combining method according to this embodiment;

FIGS. 20A and 20B are views showing the detailed arrangement of an attribute bitmapped image in the fifth embodiment, and FIG. 20C shows an attribute bitmapped image generated by a renderer.

DESCRIPTION OF THE PREFERRED EMBODIMENTS

Figure 3A:
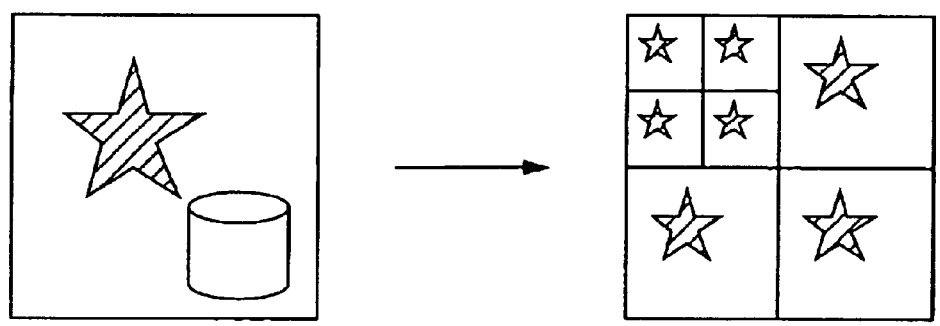
FIG. 3A is a diagram for describing transformation of a region of interest (a designated region) in an image.

Preferred embodiments of the present invention will now be described in detail with reference to the accompanying drawings.

A characterizing feature according to this embodiment resides in the provision of an image processing apparatus and method for deciding a region of interest in an image information on the basis of information that accompanies this image information, e.g., information indicative of data format, type of image and whether the image is color or monochrome, and encoding this region of interest at a compression ratio held below that of other regions, whereby a decline in the image quality of the region of interest due to the encoding thereof can be prevented while the compression ratio of the overall image information is raised.

FIG. 1 is a block diagram illustrating the construction of an image data encoding apparatus according to an embodiment of the present invention.

As shown in FIG. 1, the apparatus includes an image input unit 101 for inputting image data. By way of example, the image input unit 1 is equipped with a scanner for reading a document image, with an imaging device such as a digital camera, or with an interface for interfacing a communication line. The input image is applied to a discrete wavelet transformation unit 102, which applies a two-dimensional discrete wavelet transform to the input image data. A quantizer 103 quantizes coefficients obtained by the discrete wavelet transformation, and an entropy encoder 104 applies entropy encoding to the coefficients quantized the quantizer 103. A code output unit 105 outputs the code obtained by encoding performed by the entropy encoder 104, and a region designation unit 106 designates a region of interest in the image that has been input by the image input unit 101.

The apparatus according to this embodiment is not limited to a special-purpose apparatus of the kind shown in FIG. 1 and is applicable also to a case where a program which implements these functions is loaded in, e.g., a general-purpose personal computer or work station and the computer or work station is made to operate in accordance with the program.

In the arrangement described above, first an image signal constituting an image to be encoded is input by the image input unit 101 in the order of raster scanning. The output of the image input unit 101 is input to the discrete wavelet transformation unit 102. In the description that follows, it will be assumed that the image signal that has entered from the image input unit 101 is a monochrome multilevel image data. However, if an image signal having a plurality of color components, such as a color image, is input and encoded, it will suffice to compress the RGB color components or the luminance and chromaticity components as the monochrome components.

The discrete wavelet transformation unit 102 subjects the input image signal to two-dimensional discrete wavelet transform processing, calculates the transform coefficients and outputs these coefficients.

FIGS. 2A to 2C are diagrams useful in describing the basic construction and operation of the discrete wavelet transformation unit 102.

As shown in FIG. 2A, the image signal input from the image input unit 101 is stored in a memory 201. The image signal is read out of the memory 201 successively and transformed by a processor 202, after which the transformed signal is written to the memory 201 again.

In this embodiment, the processor 202 implements processing as shown in FIG. 2B. Here the entered image signal is separated into signals of even and odd addresses by a combination of a delay element 204 and downsamplers 205, and filter processing is applied by two filters p and u. Characters s and d represent low-pass and high-pass coefficients, respectively, when each one-dimensional image signal has been subjected to one level of decomposition. Assume that these coefficients are calculated in accordance with the following equations:

$$d(n)=x(2n+1)-\text{floor}[\{x(2n)+x(2n+2)\}/2] \quad (1)$$

$$s(n)=x(2n)+\text{floor}[\{d(n-1)+d(n)\}/4] \quad (2)$$

where x(n) represents an image signal that is to be transformed. In the above equations, floor[X] represents the largest integral value that does not exceed X.

By virtue of the processing set forth above, one-dimensional discrete wavelet transform processing is applied to the image signal from the image input unit 101. A two-dimensional discrete wavelet transform implements a one-dimensional discrete wavelet transformation successively in horizontal and vertical directions of an image. As the details of this processing is well known, the processing will not be described here.

FIG. 2C is a diagram illustrating an example of a group of transformation coefficients of two levels obtained by two-dimensional discrete wavelet transform processing. The image signal is decomposed into coefficient sequences HH1, HL1, LH1, LH2, HH2, HL2, and LL of different frequency bands. These coefficient sequences shall be referred to as "subbands" in the description that follows. The output of the discrete wavelet transformation unit 102 is delivered to the quantizer 103 in units of the subbands thus obtained.

Within an image to be encoded, a region of interest (ROI) that is to be decoded at an image quality higher than that of its surroundings is decided by the region designation unit 106, and mask information indicating which coefficients belong to the designated region is generated by the region designation unit 106 when the image of interest is subjected to the discrete wavelet transform.

FIG. 3A illustrates an example of a case where mask information is generated.

If a star-shaped ROI has been designated in an image by a prescribed command input, as indicated on the left side of FIG. 3A, the region designation unit 106 calculates the portion of each subband occupied by this ROI when the image which contains this designated region is subjected to the discrete wavelet transform. The region indicated by the mask information is a domain, which includes the transform coefficients of the surroundings, necessary when decoding the image signal on the boundary of the designated region.

An example of the mask information thus calculated in shown on the right side of FIG. 3A. In this example, mask information for when a two-level two-dimensional discrete wavelet transform is applied to the image on the left side of FIG. 3A is calculated a shown on the right side of FIG. 3A. In FIG. 3A, the star-shaped portion is the designated region, the bits constituting the mask information within this region are "1"s and the bits of the other mask information are "0"s. The entirety of this mask information is identical with the constitution of the transform coefficients obtained by the two-dimensional discrete wavelet transform. By scanning the bits within the mask information, therefore, it is possible to identify whether the coefficients at the corresponding positions fall within the designated region. The mask information thus produced is applied to the quantizer 103.

Furthermore, the region designation unit 106 receives an input of a parameter, which specifies the image quality of the designated region, from input means, not shown. The parameter may be a numerical value expressing a compression ratio assigned to the designated region, or a numerical value representing the image quality of this region. On the basis of this parameter, the region designation unit 106 calculates a bit-shift quantity B for the coefficients in the designated region and outputs this to the quantizer 103 together with the mask.

The quantizer 103 quantizes the entered coefficients by a predetermined quantization step and outputs indices corresponding to the quantized values. Quantization is carried out in accordance with the following equations:

$$q=\text{sign}(c)\cdot\text{floor}\{abs(c)/\Delta\} \quad (3)$$

$$\text{sign}(c)=1; \ c\geq 0 \quad (4)$$

$$\text{sign}(c)=-1; \ c<0 \quad (5)$$

where c represents a coefficient that undergoes quantization and abs(c) indicates represents the absolute value of c. Further, in this embodiment, it is assumed that "1" is included as a value of the quantization step $\Delta$. When the value is "1", this is equivalent to a situation in which quantization is not carried out.

Next, the quantizer 103 changes the quantization indices in accordance with the following equations based upon the mask and shift quantity B that have entered from the region designation unit 106:

$$q'=q\times 2^B; \ m=1 \quad (6)$$

$$q'=q; \ m=0 \quad (7)$$

where m represents the value of a mask at the position of the quantization index. By virtue of the processing described above, only a quantization index that belongs to the designated spatial region is shifted up by B bits in the region designation unit 106.

Figure 3B:
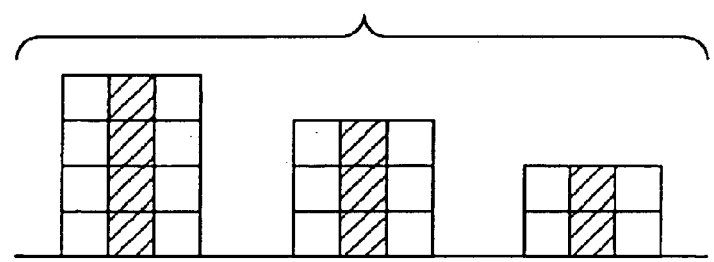
FIG. 3B is a diagram for describing image data before transforming in a region of interest (a designated region) in an image.
Figure 3C:
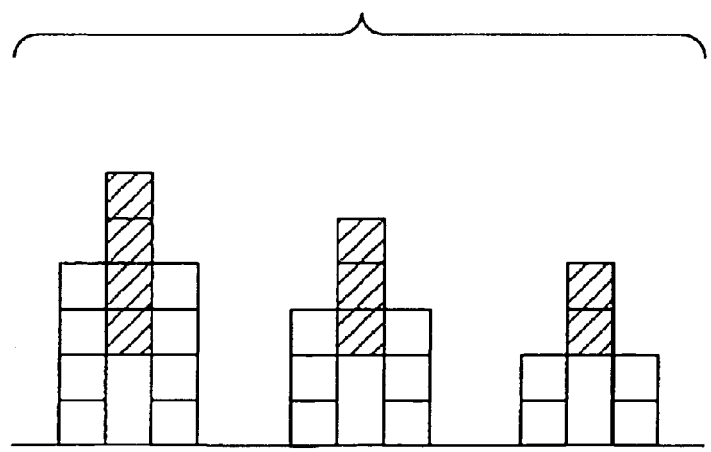
FIG. 3C is a diagram for describing a bit shift of image data after transformed in a region of interest (a designated region) in an image.

FIGS. 3B and 3C illustrate a change in quantization index by such shift-up.

In FIG. 3B, three quantization indices exist in three subbands. If the value of mask information of a quantization index that has been subjected to screening is "1" and the number B of shifts is "2", then the quantization indices after the shift will be as shown in FIG. 3C.

The quantization indices that have been changed in this manner are output to the entropy encoder 104.

The entropy encoder 104 decomposes entered quantization indices into bit planes, applies binary arithmetic encoding on a per-bit-plane basis and outputs a code stream.

Figure 4:
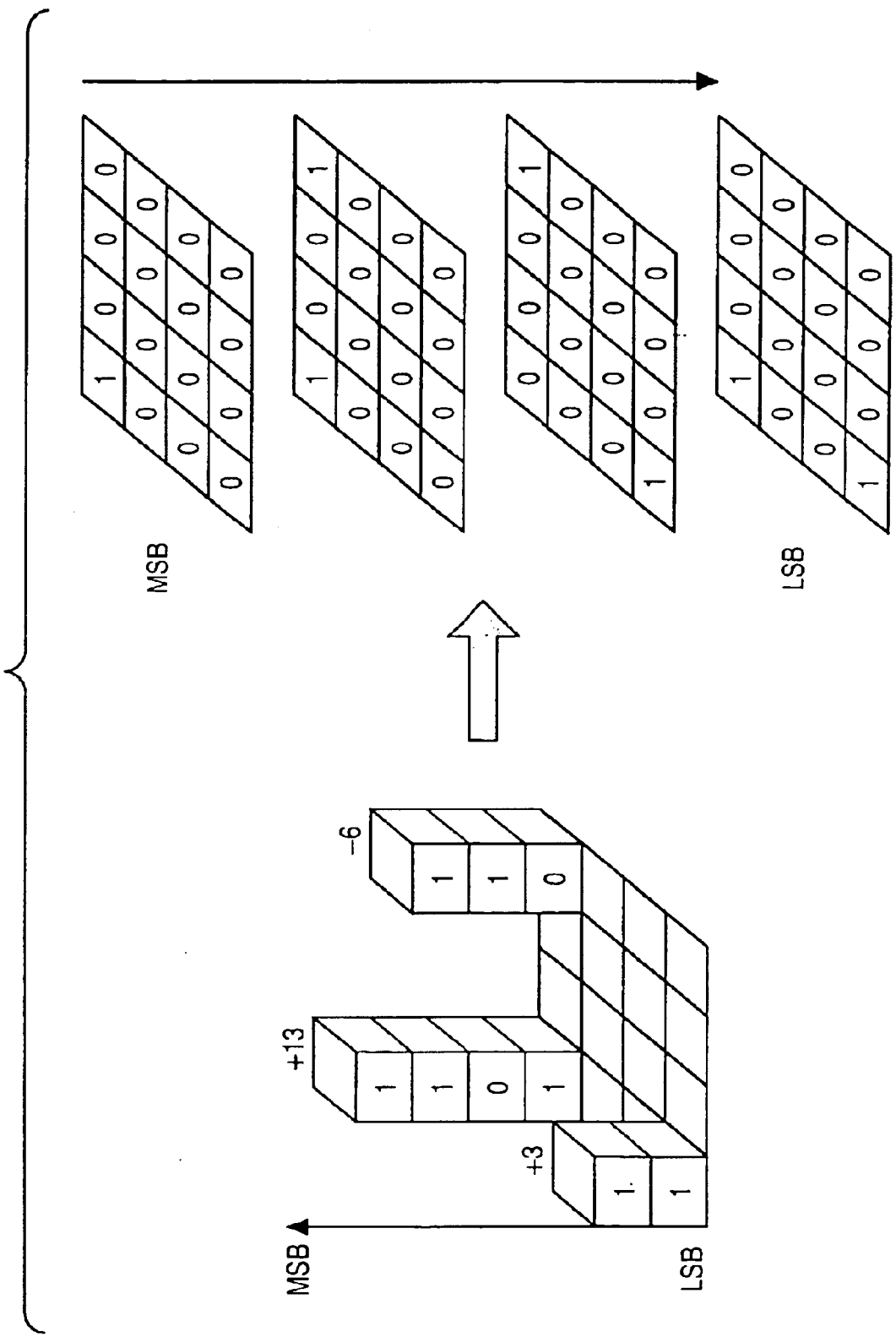
FIG. 4 is a diagram for describing the operation of an entropy encoder according to this embodiment.

FIG. 4 is a diagram for describing the operation of the entropy encoder 104 according to this embodiment.
In this example, three non-zero quantization indices exist in a region within a subband having a size of 4×4, and the values of these indices are "+13", "−6" and "+3". The entropy encoder 104 obtains a maximum value M by scanning this region and, in accordance with the following equation, calculates a number S of bits necessary to express the maximum quantization index:

$$S=\text{ceil}[\log_2\{abs(M)\}] \quad (8)$$

where ceil(x) represents the smallest integral value that is greater than x.

In FIG. 4, the maximum coefficient value is "13" and therefore the value of the bit count S is "4" and the 16 quantization indices in the sequence are processed in units of the four bit planes. First, the entropy encoder 104 applies binary arithmetic encoding to each bit of the most significant bit plane (represented by MSB in FIG. 4) and outputs the encoded bits as a bit stream. Next, the bit plane is lowered by one level and the process is repeated. This processing is repeated until the bit plane of interest reaches the least significant bit plane (represented by LSB in FIG. 4), with each bit of the bit planes being encoded and output to the code output unit 105. When the first non-zero bit is detected in the scanning of the bit planes, then the code of this quantization index undergoes entropy encoding immediately thereafter.

FIGS. 5A to 5D are schematic views representing the structure of a code sequence thus generated and output.

FIG. 5A illustrates the structure of an overall code sequence, in which MH represents a main header, TH a tile header and BS a bit stream. As shown in FIG. 5B, the main header MH possesses the size of the image to be encoded (namely the numbers of pixels in the horizontal and vertical directions of the image), tile size for when the image is divided into a plurality of tiles constituting rectangular areas, number of components representing the number of each of the color components, and component information representing the size and bit precision of each component. Since an image is not divided into tiles in this embodiment, the size and image size take on identical values. In a case where the image of interest is a monochrome multilevel image, the number of components is one.

The structure of the tile header TH is shown in FIG. 5C. The tile header TH includes tile length, which contains the bit-stream length and header length of the particular tile, an encoding parameter for the tile, mask information indicating the designated region, and number of bit shifts of the coefficients that belong to this region. The encoding parameter includes the level of the discrete wavelet transform, the type of filter, etc.

FIG. 5D illustrates the structure of a bit stream in this embodiment. Bit streams are collected on a per-subband basis and are arranged in order of increasing resolution, starting from the subband for which resolution is lowest. Furthermore, in each subband, codes are arrayed on a per-bit-plane basis from a high-order bit plane (S-1) to a low-order bit plane.

By thus arraying the codes, it is possible to perform hierarchical decoding shown in FIGS. 9A and 9B, described later.

In the embodiment described above, the compression ratio of the overall image to be encoded can be controlled by changing the quantization step $\Delta$.

In an alternative method according to this embodiment, the low-order bits of a bit plane to be encoded in the entropy encoder 104 can also be limited (discarded) in conformity with the required compression ratio. In this case, all bit planes are not encoded; encoding is carried out from the high-order bit plane to bit planes the number of which conforms to the desired compression ratio and the result is included in the final code sequence.

If the function for limiting the low-order bit planes is utilized, only bits corresponding to the designated region shown in FIGS. 3A to 3C are included in the code sequence in large quantity. In other words, it is possible to encode only the designated area, at a low compression ratio, as an image having a high image quality.

Next, a method of decoding a bit stream that has been encoded by the image encoding apparatus set forth above will be described.

Figure 6:
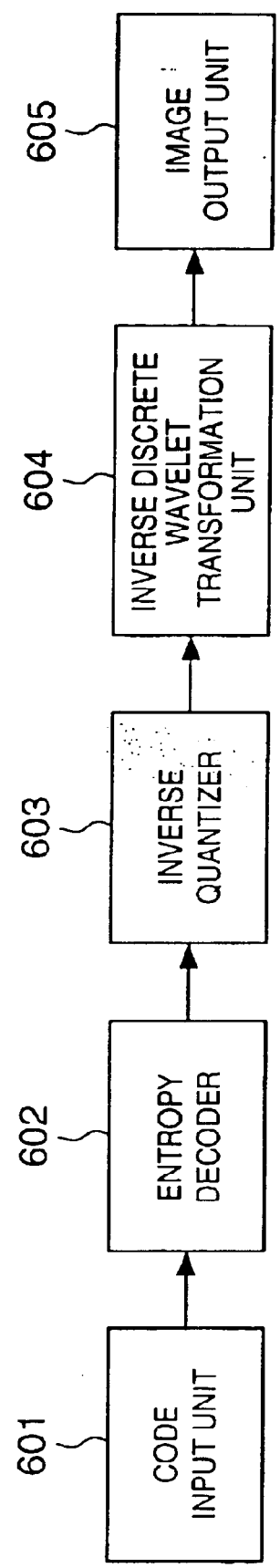
FIG. 6 is a block diagram illustrating the construction of an image decoding apparatus according to this embodiment.

FIG. 6 is a block diagram illustrating the construction of an image decoding apparatus according to this embodiment. The apparatus includes a code input unit 601, an entropy decoder 602, an inverse quantizer 603, an inverse discrete wavelet transformation unit 604 and an image output unit 605.

The code input unit 601 inputs a code sequence that has been encoded by the above-described encoding apparatus, analyzes the header contained in this code sequence and extracts the parameter necessary for subsequent processing. If necessary, the code input unit 601 controls the flow of processing or sends the particular parameter to a succeeding processing unit. Further, the bit stream contained in the code sequence is output to the entropy decoder 602.

The entropy decoder 602 subjects the bit stream, which is output from the code input unit 601, to decoding on a per-bit-plane basis and outputs the result. The decoding procedure at such time is illustrated in FIG. 7.

Figure 7:
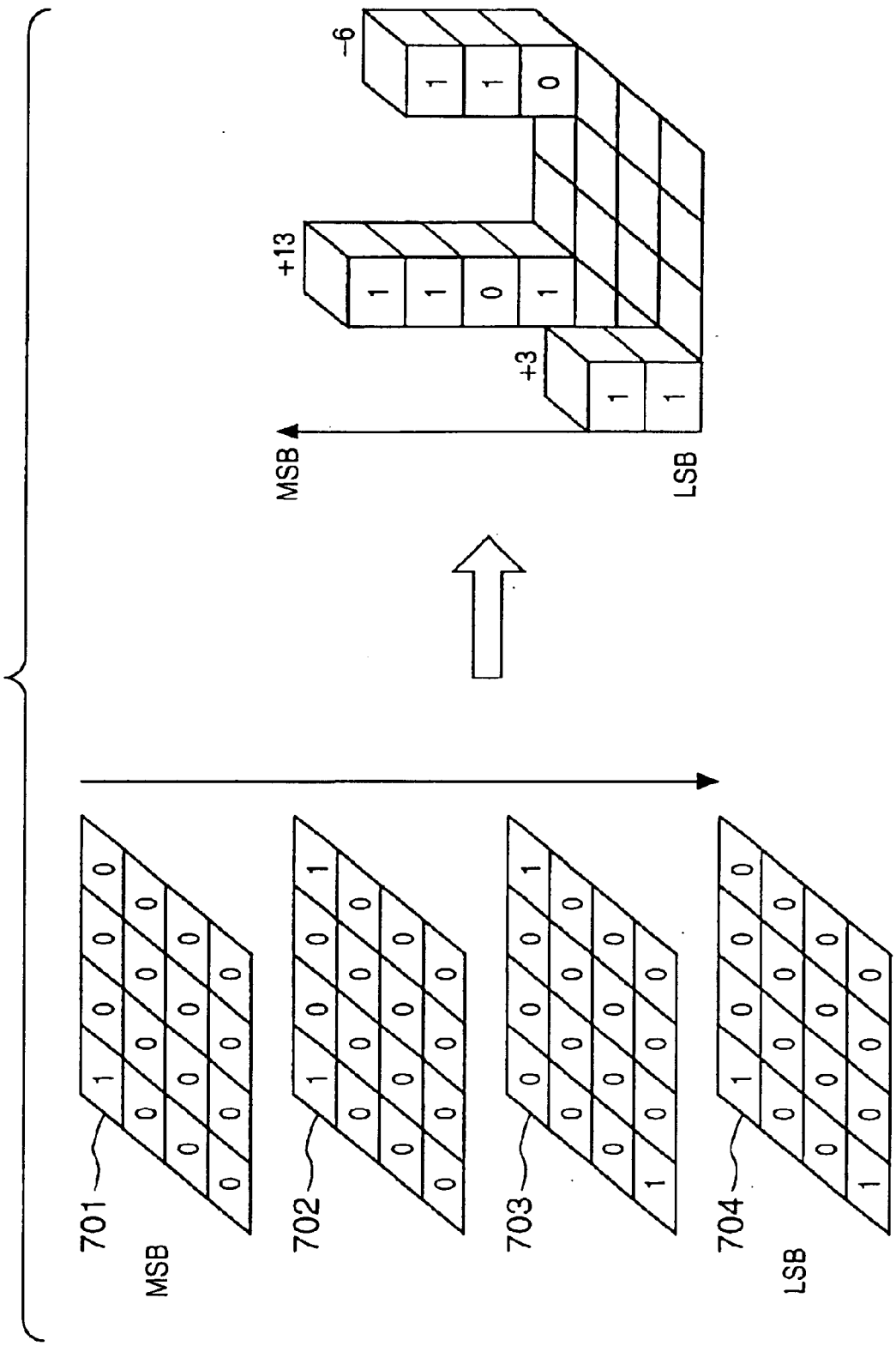
FIG. 7 is a diagram for describing bit planes and the order of decoding of the bit planes in accordance with an entropy decoder according to this embodiment.

Numerals 701 to 704 on the left side of FIG. 7 denote the flow through which one region of a subband to be decoded is successively decoded on a per-bit-plane basis and quantization indices are finally decoded. The bit planes are decoded in the order indicated by the arrow in FIG. 7 (701→702→703→704). The quantization indices that have been decoded are output to the inverse quantizer 603.

The inverse quantizer 603 decodes discrete wavelet transform coefficients from the entered quantization indices in accordance with the following equations:

$$c' = \Delta \times q/2^u; \quad q \neq 0 \quad (9)$$

$$c' = 0 \quad q = 0 \quad (10)$$

$$U = B; \quad m = 1 \quad (11)$$

$$U = 0; \quad m = 0 \quad (12)$$

where q represents a quantization index and $\Delta$ a quantization step. The quantization step $\Delta$ has a value the same as that used when encoding was performed. Further, B represents a bit-shift count read out of the tile header, m denotes the value of a mask at the position of the particular quantization index, and c' represents a decoded transformation coefficient. This is obtained by decoding a coefficient represented by s or d at the time of encoding. The transformation coefficient c' is output to the succeeding inverse discrete wavelet transformation unit 604.

Figure 8A:
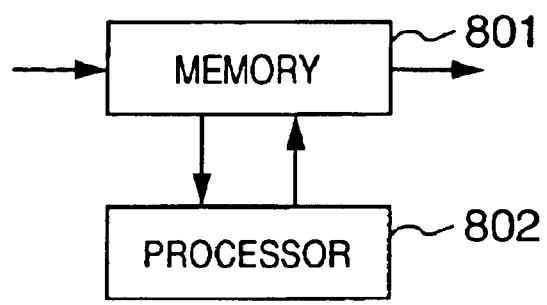
FIG. 8A is a block diagram illustrating the general construction of a wavelet decoder according to this embodiment.
Figure 8B:
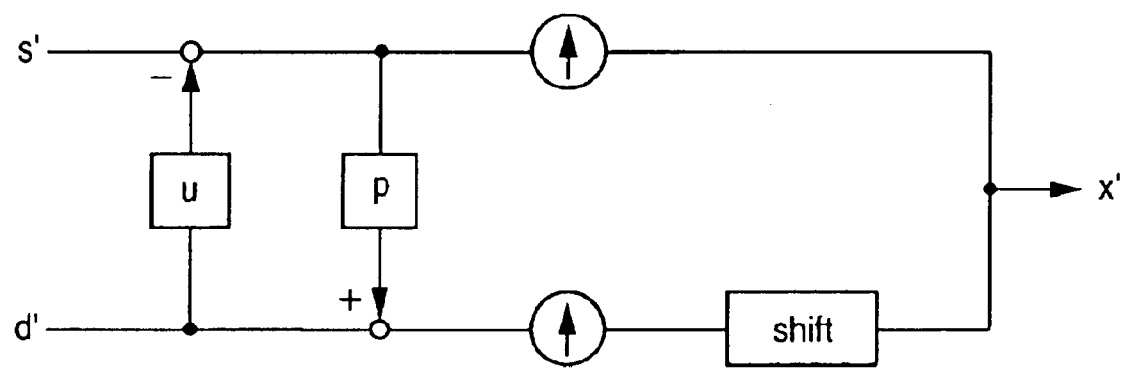
FIG. 8B is a block diagram illustrating the functional performance of a wavelet decoder according to this embodiment.

FIGS. 8A and 8B are block diagrams illustrating the construction and processing of the inverse discrete wavelet transformation unit 604 according to this embodiment.

In FIG. 8A, entered transformation coefficients are stored in a memory 801. A processing unit 802 implements a one-dimensional inverse discrete wavelet transform, reads the transformation coefficients out of the memory 801 successively and performs processing, thereby executing a two-dimensional inverse discrete wavelet transform. A two-dimensional inverse discrete wavelet transform is implemented through a procedure that is the inverse of the forward transform. The details of this are well known and need not be described. FIG. 8B shows processing blocks of the processing unit 802. Here the entered transformation coefficients are subjected to the processing of the two filters u and p. After upsampling is performed, the coefficients are superimposed and the processing block outputs an image signal x'. These processes are executed in accordance with the following equations:

$$x'(2n) = s'(n) - \text{floor}[\{d'(n-1) + d'(n)\}/4] \quad (13)$$

$$x'(2n+1) = d'(n) + \text{floor}[\{x'(2n) + x'(2n+2)\}/2] \quad (14)$$

The discrete wavelet transforms in the forward and reverse directions in accordance with Equations (1), (2) and Equations (13), (14) satisfy the conditions for full reconstruction. In this embodiment, therefore, if the quantization step $\Delta$ is "1" and all bit planes have been decoded in the decoding of the bit planes, the decoded signal x' will agree with the signal x representing the original image.

By virtue of the above-described processing, an image is decoded and outputted to the image output unit 605. The latter may be an image display unit such as a monitor or a storage device such as a magnetic disk.

Figure 9A:
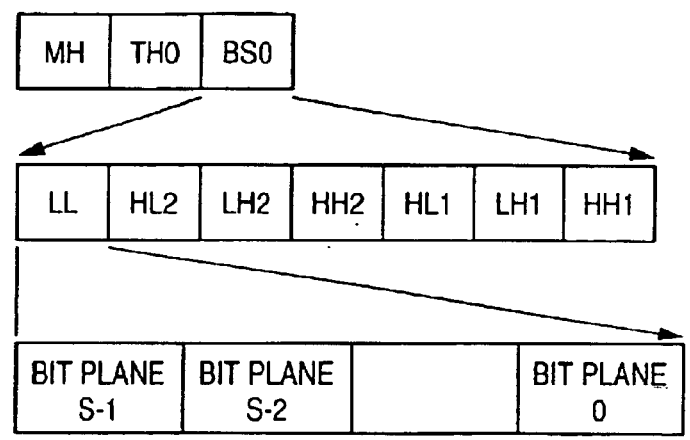
FIG. 9A is a diagram for describing an example of a code sequence and each subband when the code sequence is decoded in the case of spatial scalability.
Figure 9B:
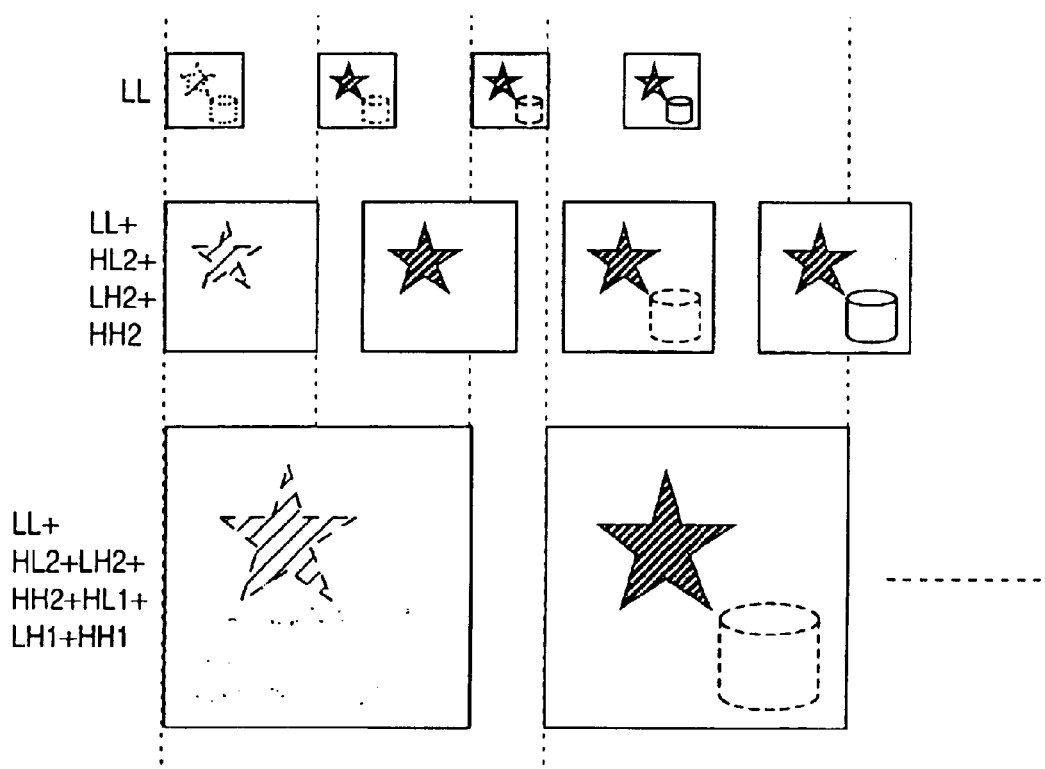
FIG. 9B is a diagram for describing the sizes of images displayed in correspondence with subbands and a change in reproduced images that accompanies the decoding of the code sequence of each subband in the case of spatial scalability.

Reference is made to FIGS. 9A and 9B to describe the form in which an image is displayed when an image is decoded and displayed by the procedure set forth above.

FIG. 9A is a diagram illustrating an example of code sequences, in which the basic structure is based upon FIGS. 5A to 5D. Here the overall image has been set as a tile and therefore the code sequence includes a single tile header and bit stream. A bit stream BS0 includes code arrayed in order of increasing resolution starting from LL, which is the subband that corresponds to the lowest resolution. Furthermore, in each subband, codes are arrayed on a per-bit-plane basis from a high-order bit plane to a low-order bit plane.

The decoding apparatus reads in the bit stream in successive fashion and displays an image when code corresponding to each bit plane has been decoded. FIG. 9B illustrates the correspondence between each subband and the size of a displayed image as well as a change in the image that accompanies the decoding of the code sequence within the subband. It can be understood from FIG. 9B that the code sequence corresponding to LL is read out successively and that image quality gradually improves as the decoding processing of each bit plane progresses. At this time the star-shaped portion that was the designated region at the time of encoding is reconstructed with an image quality higher than that of other portions.

The reason for this is as follows: The quantization indices that belong to the designated region of the image are bit-shifted up in the quantizer at the time of quantization. At the decoding of a bit plane, therefore, the quantization indices are decoded at an earlier time than in the other portions of the image. The decoding of the designated region at a high image quality in this manner is similar for other resolutions.

Furthermore, when all bit planes have been decoded, the designated region and the other portions of the image are identical in terms of image quality. However, in a case where decoding is suspended in mid-course, an image in which the designated region has been reconstructed to have an image quality higher than other portions will be obtained.

In the embodiment described above, it is possible to reduce the amount of encoded data received or processed and, as a result, control the compression ratio, by limiting (neglecting) low-order bit planes decoded in the entropy decoder 602. By adopting such an expedient, it is possible to obtain a decoded image of a desired image quality from only the encoded data of the required amount. In a case where the value of the quantization step $\Delta$ at the time of encoding is "1" and all bit planes are decoded at the time of decoding, it is possible to realise reversible encoding/decoding in which the reconstructed image agrees with the original image.

If the function for limiting the low-order bit planes is utilised, only bits corresponding to the designated region shown in FIG. 3A are included in a quantity larger than that of other areas in the code sequence that is to be decoded. The end result, therefore, is that it is possible to obtain an effect similar to the decoding of data obtained by encoding only a designated region at a low compression ratio and as an image having a high image quality.

In the description rendered above, an example in which spatial scalability is used is illustrated. It goes without saying, however, that similar effects are obtained even in a system that uses SNR scalability.

In this case, FIGS. 5A to 5D for describing the encoder are replaced by FIGS. 10A to 10D, and FIGS. 9A to 9D for describing the decoder are replaced by FIGS. 11A to 11D. Reference will now be had to FIGS. 10A to 11B.

FIGS. 10A to 10D are schematic views representing the structure of a code sequence generated and output by SNR scalability.

FIG. 10A illustrates the structure of an overall code sequence, in which MH represents a main header, TH a tile header and BS a bit stream. As shown in FIG. 10B, the main header MH possesses the size of the image to be encoded (namely the numbers of pixels in the horizontal and vertical directions of the image), tile size for when the image is divided into a plurality of tiles constituting rectangular areas, number of components representing the number of each of the color components, and component information representing the size and bit precision of each component. Since an image is not divided into tiles in this embodiment, the tile size and image size take on identical values. In a case where the image of interest is a monochrome multilevel image, the number of components is one.

The structure of the tile header TH is shown in FIG. 10C. The tile header TH includes tile length, which contains the bit-stream length and header length of the particular tile, an encoding parameter for the tile, mask information indicating the designated region, and number of bit shifts of the coefficients that belong to this region. The encoding parameter includes the level of the discrete wavelet transform, the type of filter, etc.

Decoding side can discriminate and decode the region of interest (ROI) of the encoding data which does not include the mask information, in a case where the above described number of bit shift is equal to the number of bits which represents each of quantization indices, namely the bits are shifted up on the condition that region of interest (ROI) and non region of interest (non-ROI) do not exist on the same bits plane.

FIG. 10D illustrates the structure of a bit stream in this embodiment. Bit streams are collected on a per-bit-plane basis and are arranged from a high-order bit plane (S-1) to a low-order bit plane. In each bit plane the results of encoding the bit plane of the quantization indices in each subband are arranged successively on a per-subband-basis. In FIG. 10D, S represents the number of bits necessary to express the largest quantization index. The code sequences thus generated are output to the code output unit 105.

By thus arraying the codes, it is possible to perform hierarchical decoding of the kind shown in FIG. 11A, described later.

Figure 11A:
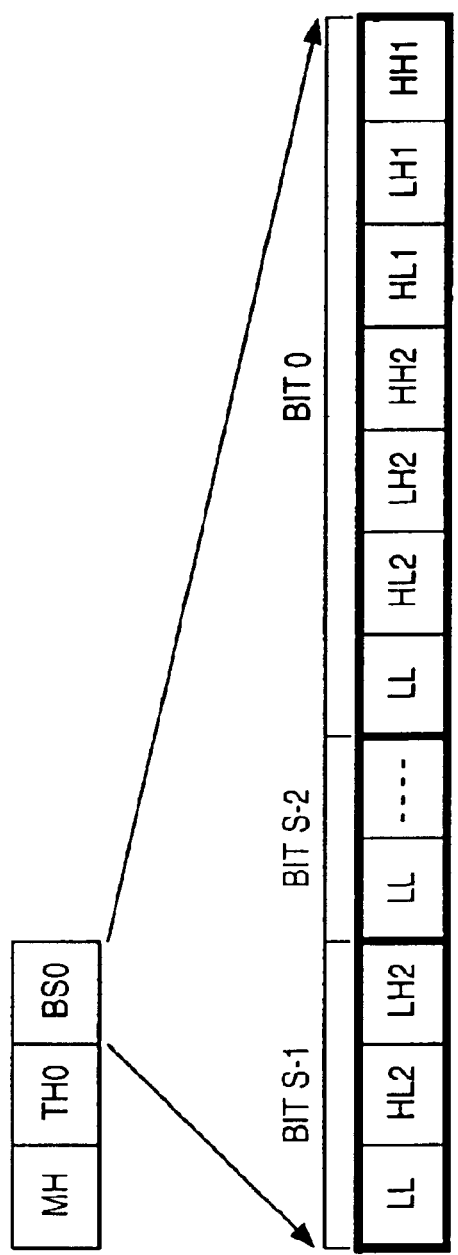
FIG. 11A is a diagram for describing a code sequence and processing for the decoding thereof in case of SNR scalability.
Figure 11B:
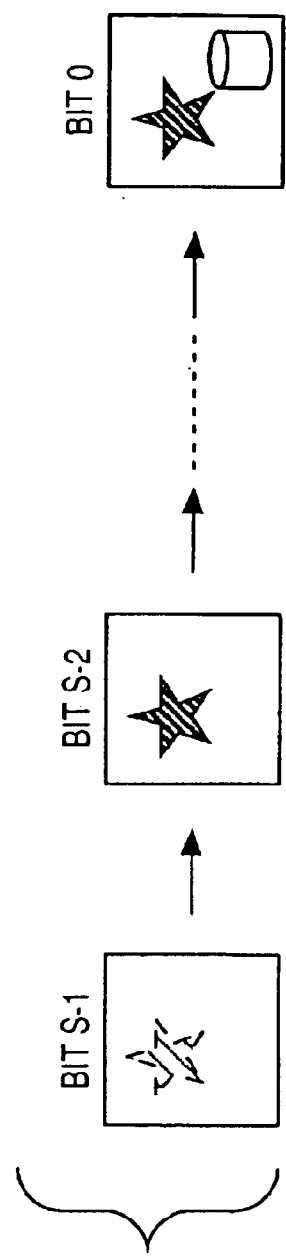
FIG. 11B is a diagram showing the quality of an image generated by describing a code sequence and processing for the decoding thereof in case of SNR scalability.

FIGS. 11A and 11B are diagrams useful in describing the form in which an image is displayed when the code sequence shown in FIG. 10 is decoded and displayed.

FIG. 11A is a diagram illustrating an example of a code sequence, in which the basic structure is based upon FIGS. 10A to 10D. Here the overall image has been set as a tile and therefore the code sequence includes a single tile header and bit stream. A bit stream BS0 includes code arrayed in order from the highest-order bit plane to the lowest-order bit plane.

The above-described decoding apparatus reads in the bit stream in successive fashion and displays an image when code corresponding to each bit plane has been decoded. In FIG. 11A, image quality gradually improves as the decoding processing of each bit plane progresses. The star-shaped portion that was the designated region at the time of encoding is reconstructed with an image quality higher than that of other portions.

As set forth earlier, the reason for this is as follows: The quantization indices that belong to the designated region of the image are bit-shifted up in the quantizer at the time of encoding. At the decoding of a bit plane, therefore, the quantization indices are decoded at an earlier time than in the other portions of the image.

Furthermore, when all bit planes have been decoded, the designated region and the other portions of the image are identical in terms of image quality. However, in a case where decoding is suspended in mid-course, an image in which the designated region has been reconstructed to have an image quality higher than other portions will be obtained.

The characterizing features of this embodiment will now be described in the case of a printing apparatus.

Figure 12:
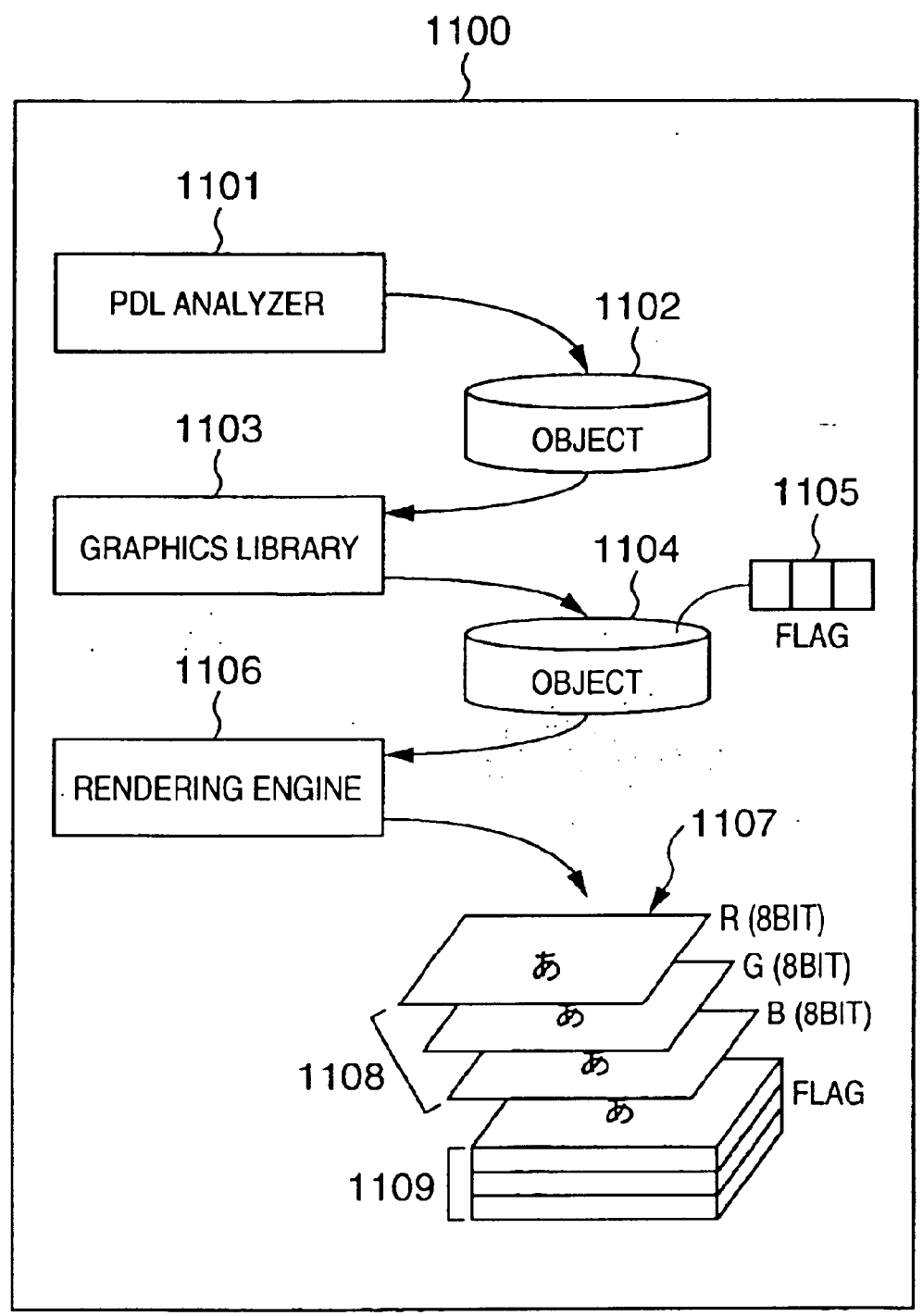
FIG. 12 is a diagram for describing processing of an object to be printed in a printing apparatus according to this embodiment.

FIG. 12 is a diagram useful in describing processing of an object to be printed in a printing apparatus according to this embodiment.

In FIG. 12, a controller 1100 administers control of the overall operation of the printing apparatus according to this embodiment. The controller 1100 includes a PDL analyzer 1101 for analyzing and interpreting PDL data (print data) that enters from an external device such as a host computer. A print object 1102 is created by analyzing the entered PDL data using the PDL analyzer 1101. A graphics library 1103 converts the object 1102 to a command object 1104 that can be interpreted by a rendering engine 1106 and adds information 1105 (which will be described later with reference to FIG. 13) to the object 1104. The object 1104 is input to the rendering engine 1106, which proceeds to manipulate the bit information and create bitmap image data 1107 for printing, as will be described later with reference to FIGS. 14 and 15. The bitmap image data 1107 includes image data (1108) comprising R, G, B color components of eight bits each, and 3-bit information (bit/pixel) (1109).

FIG. 13 is a chart for describing the meaning of each bit of the information 1105.

As shown in FIG. 13, the information 1105 is composed of three bits. Bit 0 is a bit (referred to as a "bitmap flag") indicative of a bitmap or vector graphic. The bit is set to "0" in case of a bitmap and to "1" in case of a vector. Bit 1 is a bit (referred to as a "color flag") indicative of a color object or monochrome object. The bit is "0" in case of color and "1" in case of monochrome. Bit 2 is a bit referred to as a "character flag". In a case where the bitmap flag is "0" (bitmap data), the bit 2 is indicative of a character (="1") or of an image other than a character (="0"). In a case where the bitmap flag is "1" (vector data), the bit 2 indicates grayscale priority (="0") or resolution priority (="1").

Figure 14:
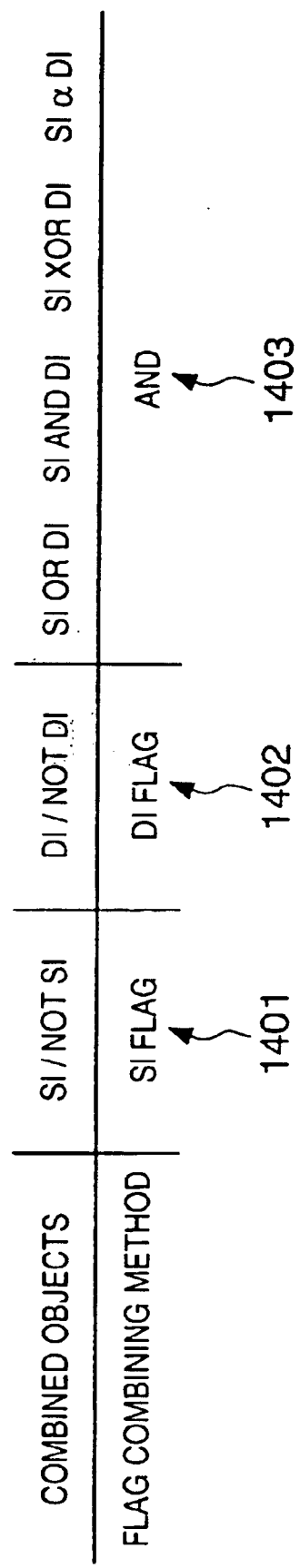
FIG. 14 is a diagram for describing combinations of objects and a flag combining method according to this embodiment.

FIGS. 14 and 15 are diagrams useful in describing methods of combining a source image (SI) and a destination image (DI).

In FIG. 14, numeral 1401 indicate a case where an object to be combined is only SI (the source image only, i.e., the object is overwritten) or only Not SI (a case where a 0/1 reversal of the source image is made and the object is overwritten). This case indicates that the 3-bit flag (SIflag) of SI is left as the 3-bit information 1109. Numeral 1402 indicate a case where an object to be combined is only DI (the destination image only, i.e., the underlying background is utilized as is) or only Not DI (a 0/1 reversal of the destination bit is performed). This case indicates that the 3-bit flag (DIflag) of DI is left as the 3-bit information 1109. Numeral 1403 indicate a method of combining SI and DI. This includes "SI or DI" (the logical sum or SI and DI), "SI and DI" (the logical product of SI and DI), "SI xor DI" (the exclusive OR between SI and DI) and "SI α DI" (an α operation between SI and DI, namely an AND, OR or XOR operation between SI and DI having transparency). This case indicates finding the logical product between the bits of the 3-bit information of SI and the bits of the 3-bit information of DI and deciding that the result is information representing the combined image.

FIG. 15 is a diagram useful in describing another combining method. In a manner similar to 1401 above, numeral 1501 indicate a case where an object to be combined is only SI (the source image only, i.e., the object is overwritten) or only Not SI (a NOT operator of the source, meaning that a 0/1 reversal of the source bit is performed and the object is overwritten). This case indicates that the 3-bit information of SI is left as the information 1109. In a manner similar to 1402 above, numeral 1502 indicate a case where an object to be combined is only DI (the destination image only, i.e., the underlying background is utilized as is) or only Not DI (a NOT operator of the destination, meaning that a 0/1 reversal of the destination bit is performed). This case indicates that the 3-bit information of DI is left as the information 1109. Numeral 1403 indicate a method of combining SI and DI. This includes "SI or DI" (the logical sum or SI and DI), "SI and DI" (the logical product of SI and DI), "SI xor DI" (the exclusive OR between SI and DI) and "SI α DI" (an α operation between SI and DI, namely an AND, OR or XOR operation between SI and DI having transparency). This case indicates that the bit information (SIflag) of SI is left as is if SI and DI are identical for each bit of the 3-bit information of SI and DI, and that 0 (000) (indicative of a bitmap, color and anything other than a character) is set as the bit information if SI and DI are not identical.

Figure 16:
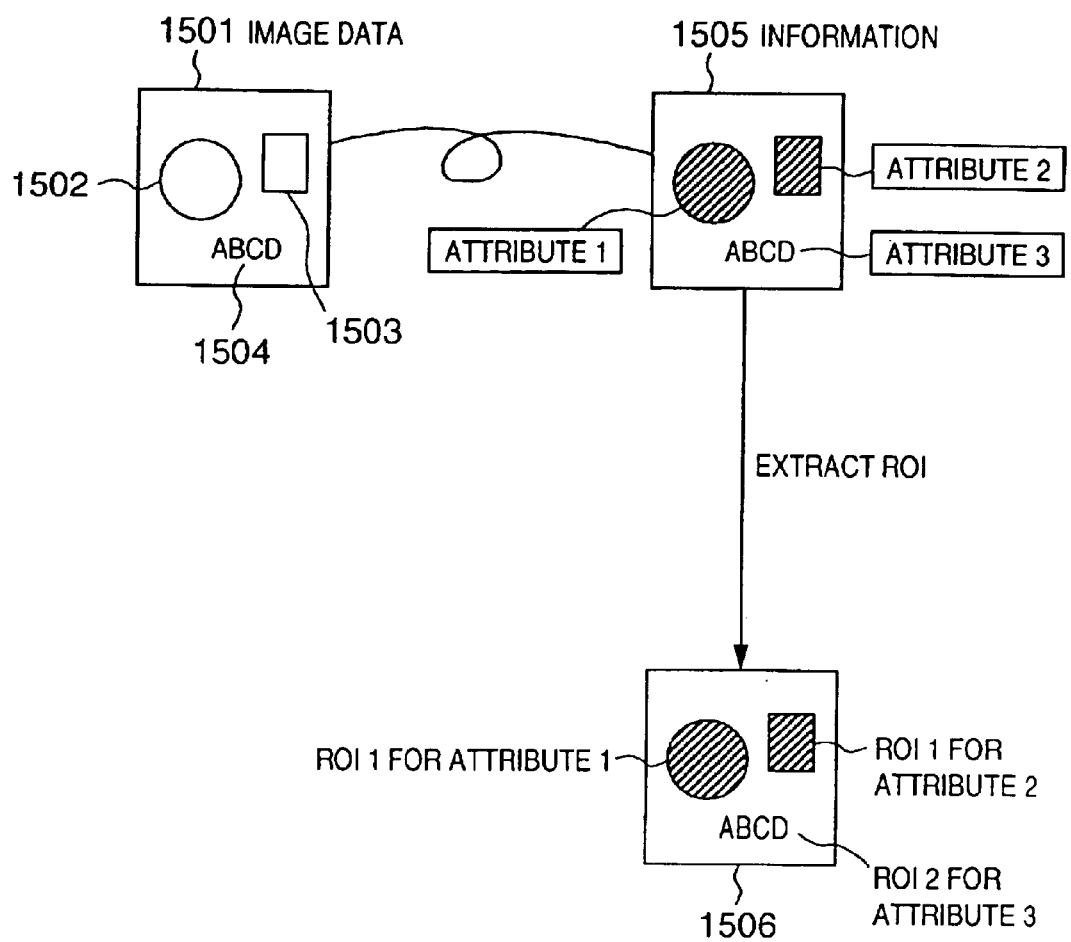
FIG. 16 is a diagram for describing region designation processing based upon bit information according to this embodiment.

FIG. 16 is a diagram useful in describing region designation in print image data that has been generated in a printing apparatus according to this embodiment.

In FIG. 16, image data 1501 corresponds to the RGB image data 1108 of FIG. 12, and an image 1502 is an image data area having an attribute 1 (e.g., 000: bitmap; color; anything other than a character) defined by the information illustrated in FIG. 13. Similarly, an image 1503 is an image data area having an attribute 2 (e.g., 010: bitmap; monochrome; anything other than a character) defined by the information illustrated in FIG. 13. Further, an image 1504 is an image data area having an attribute 3 (e.g., 001: bitmap; monochrome; character) defined by the information illustrated in FIG. 13. Numerals 1505 denote information, equivalent to flag 1109 in FIG. 12, corresponding to the image data 1501.

This embodiment is characterized in that 3-bit information is used in order to decide a region of interest (ROI) in the region designation unit 106 (for designating the ROI) of FIG. 1. More specifically, the information 1505 (which corresponds to the flag 1109 in FIG. 12) shown in FIG. 16 is entered, areas capable of being an ROI are extracted (1506) based upon this information, and the rendering engine 1106 decides the area to be used as the ROI from the areas that have been extracted.

The method of selecting this ROI is determined by providing a priority for the state of each bit of the 3-bit information shown in FIG. 13 and giving precedence to data having an attribute which gives priority to image quality (an attribute for which quality will not decline at a high ratio of compression). For example, settings are made in such a manner that an image region (vector; color; resolution priority) for which the 3-bit information is "101" is adopted as an important high-quality image area, and such that an image region (vector; color; grayscale priority) for which the 3-bit information is "100" is adopted as the next most important high-quality image area.

In relation to this assignment of priority, it is necessary to incorporate also the print engine characteristics, etc., though this is not particularly defined here.

Figure 17:
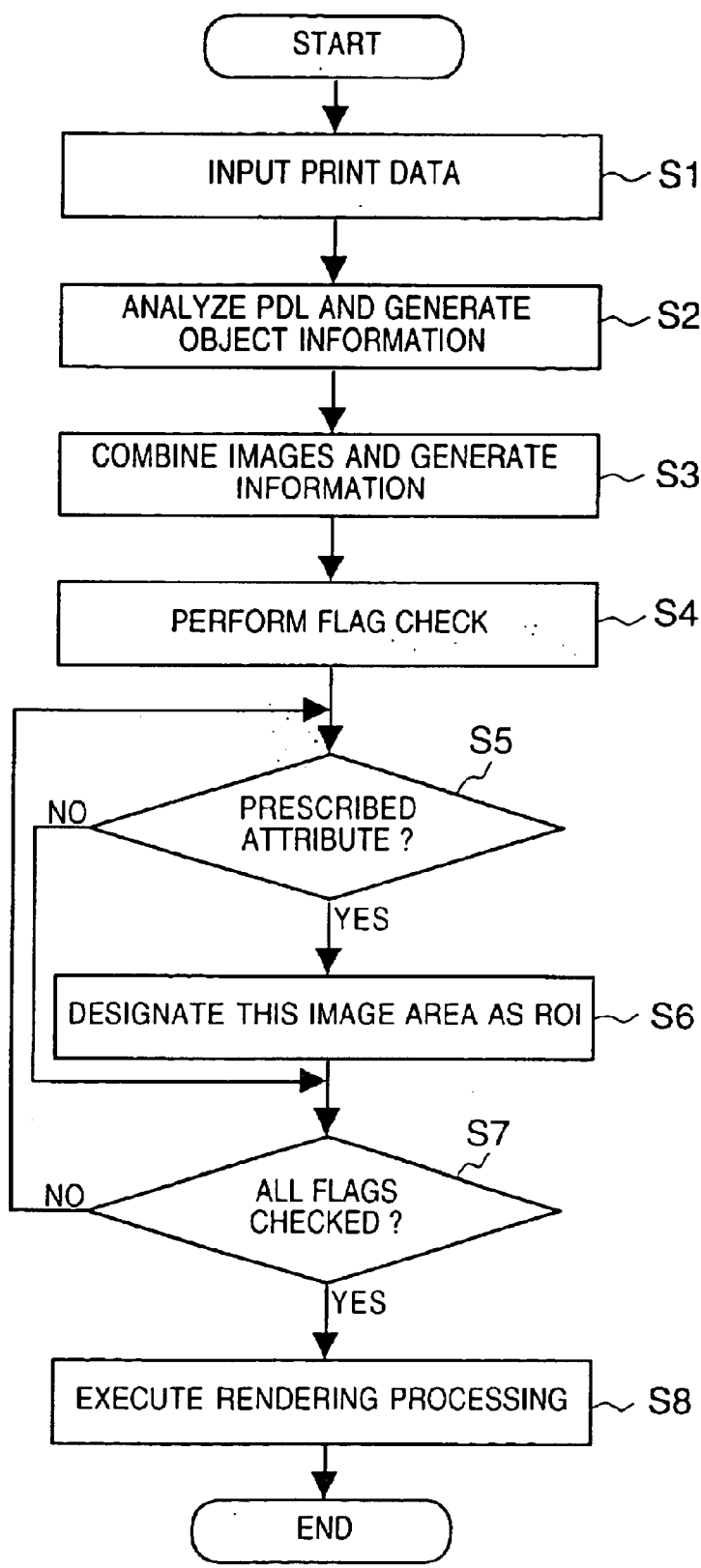
FIG. 17 is a flowchart for describing region designation processing in a printing apparatus according to this embodiment.

FIG. 17 is a flowchart useful in describing region designation processing in a printing apparatus according to this embodiment.

Step S1 of the flowchart calls for entry of print data (drawing command) from a host computer. Next, at step S2, the entered print data (drawing command) is analyzed and an object that can be referred to at the succeeding rendering processing is generated. Control then proceeds to step S3, at which combination of images and the accompanying processing for generating 3-bit information are executed, in the manner described in connection with FIGS. 14 and 15, in accordance with a print data command.

Control then proceeds to step S4, at which the flag 1109 is checked to determine whether the 3-bit information indicates a prescribed attribute (e.g., vector data; color; resolution priority). If the answer is "YES", control proceeds to step S6, where the image region to which this flag is attached is set as the ROI. Next, it is determined at step S7 whether all flags have been checked. The processing of steps S5 to S7 is repeatedly executed until all flags 1109 have been checked. When a designated region has thus been decided, control proceeds to step S8. Here rendering processing is executed to generate the bitmap image data 1107 that includes the image data 1108 and flag 1109 shown in FIG. 12.

The same effects are obtained through another method, namely deciding the ROI upon examining the image data 1108 of eight bits for each of R, G, B in the bitmap image data 1107 after all data have been rendered, i.e., after the bitmap image data 1107 has been obtained.

Such region designation processing is not limited to execution in a printer. It goes without saying that this processing can be applied when encoding video or a photographic image shot by an X-ray camera or digital camera. The technique for designating the region is in no way limited to a printer.

[Second Embodiment]

In the embodiment described above, priority is assigned to bit information. However, an image having a high quality overall can be obtained by selecting as the ROI a portion for which the 3-bit information takes on the largest area and reporting this portion to the rendering engine 1106.

[Third Embodiment]

In the first and second embodiments, a single region is selected as the ROI. However, in a case where a plurality of regions can be designated as ROIs, a plurality of ROIs may be designated based upon the first and second embodiments.

It goes without saying that in the first to third embodiments, the region designation method of the present invention can be adapted to all compression schemes that have a function equivalent to an ROI.

[Fourth Embodiment]

The first to third embodiments set forth above illustrate an example in which an ROI is found from 3-bit information. However, in a printing apparatus that employs a plurality of compression methods that do not use an ROI, it is possible to use the bit information as a reference for selecting the compression method. As one example, consider a case where the printer supports PackBits compression and JPEG compression. In such case the bit information is examined and JPEG compression is used for an image having many color images and PackBits compression is used for an image having many monochrome characters. Furthermore, the combination of the compression method and bit information can be decided substantially automatically by the characteristics of the compression method.

It goes without saying that the present invention may include in a case where quantization process or inverse quantization process is omitted from the encoding step and the decoding step in the above embodiments. In such cases, the coefficients prior to quantization, instead of the quantization index, can be shifted up and then each bits plane obtained by the quantization can be encoded.

[Fifth Embodiment]

A fifth embodiment in which the present invention is applied to a color laser beam printer (to be abbreviated to LBP hereinafter) will be described below. In the fifth embodiment, a color laser beam printer is described as an example of a printing apparatus. However, the present invention can be applied to other types of color printers such as a color ink-jet printer and color thermal transfer printer.

The arrangement of the LBP will be described first with reference to FIG. 18.

Figure 18:
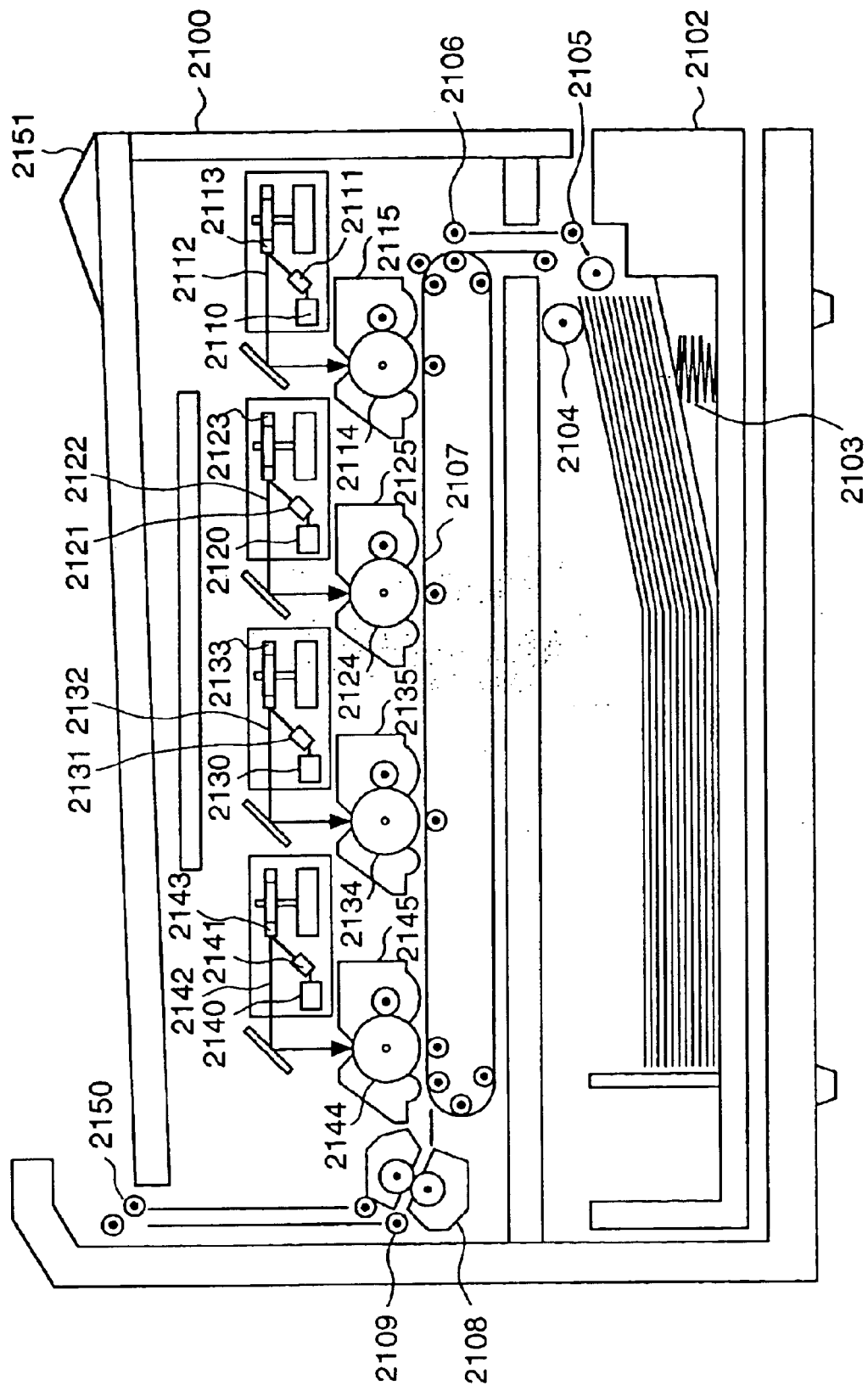
FIG. 18 shows a sectional view showing the internal structure of an LBP according to a fifth embodiment.

FIG. 18 is a sectional view showing the internal structure of the LBP according to the fifth embodiment.

Figure 19:
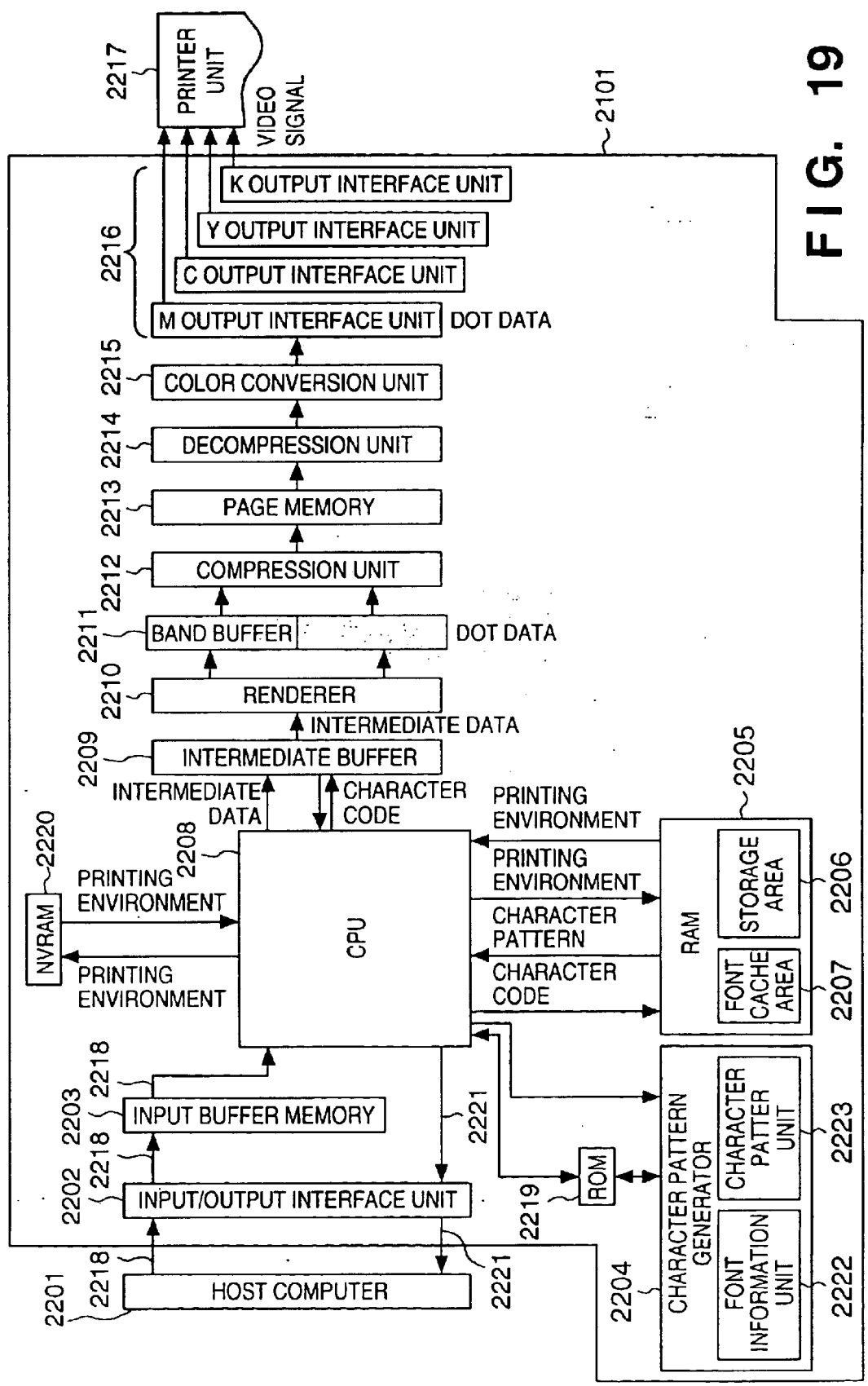
FIG. 19 is a block diagram showing a schematic arrangement of a control system of the LBP according to the fifth embodiment in FIG. 18.

Referring to FIG. 18, reference numeral 2100 denotes an LBP body which generates character patterns, graphic patterns, images, and the like and form them on printing media as printing sheets in accordance with character print instructions (drawing command), various graphic pattern print instructions (drawing command), image print instruction, color designation instructions, and the like supplied from a host computer (2201 in FIG. 19).

Reference numeral 2151 denotes an operation panel on which switches for operation, an LED display unit for displaying the state of the LBP body 2100, an LCD unit, and the like are arranged; and numeral 2101 denotes a printer control unit for controlling the overall LBP body 2100 and analyzing character print instructions and the like supplied from the host computer. To convert pieces of R, G, and B color information into M (Magenta), C (Cyan), Y (Yellow), and K (black), the LBP according to the fifth embodiment includes M, C, Y, and K image forming/developing mechanisms. The printer control unit 2101 generates M, C, Y, and K print images, converts them into video signals, and outputs them to M, C, Y, and K laser drivers.

An M (Magenta) laser driver 2110 is a driving circuit for a semiconductor laser 2111, which on/off-controls a laser beam 2112 emitted from the semiconductor laser 2111 in accordance with an input video signal. The laser beam 2112 is laterally deflected by a rotating polygon mirror 2113 to scan an electrostatic drum 2114. With this operation, an electrostatic latent image such as a character or graphic pattern is formed on the electrostatic drum 2114. This electrostatic latent image is developed by a developing unit (toner cartridge) 2115 located around the electrostatic drum 2114 and then transferred onto a printing sheet.

For C (Cyan), Y (Yellow), and K (black), the LBP has image forming/developing mechanisms similar to the one for M (Magenta). Reference numerals 2120, 2121, 2122, 2123, 2124, and 2125 denote image forming/developing mechanisms for C (Cyan); 2130, 2131, 2132, 2133, 2134, and 2135, image forming/developing mechanisms for Y (Yellow); and 2140, 2141, 2142, 2143, 2144, and 2145, image forming/developing mechanisms for K (black). Each mechanism has the same function as that of the M (Magenta) image forming/developing mechanism. Since these mechanisms have the same arrangement, a description thereof will be omitted.

As printing paper, printing cut sheets are used, which are stored in a paper feed cassette 2102 mounted in the LBP body 2100 and held at a predetermined level by a spring 2103. A cut sheet is fed into the apparatus by a feed roller 2104 and convey rollers 2105 and 2106 and conveyed on a paper convey belt 2107 to pass through each image forming/developing unit.

M, C, Y, and K toners (powder inks) transferred onto the printing sheet are fixed thereon by a fixing unit 2108 with heat and pressure. The printing sheet is then output to the upper portion of the LBP body 2100 by convey rollers 2109 and 2150.

FIG. 19 is a block diagram showing the schematic arrangement of the control system of the LBP according to the fifth embodiment in FIG. 18.

The printer control unit 2101 of this LBP receives data 2218 including character, graphic pattern, and image print instructions, color information, and the like sent from the host computer 2201 serving as a print information source. A CPU 2208 processes the received data. The resultant character information and the like are printed in units of pages.

Reference numeral 2202 denotes an input/output interface unit for exchanging various kinds of information with the host computer 2201; and numeral 2203 denotes an input buffer memory for temporarily storing various kinds of information input through the input/output interface unit 2202.

Reference numeral 2204 denotes a character pattern generator which is comprised of a font information unit 2222 in which attributes such as the widths and heights of characters and the addresses of actual character patterns are stored, a character pattern unit 2223 in which character patterns themselves are stored, and a control program (not shown) for reads from these units. The control program is stored in a ROM 2219 and also has a code convert function for calculating the address of a character pattern corresponding to a received character code.

Reference numeral 2205 denotes a RAM including a font cache area 2207 in which character patterns output from the character pattern generator 2204 are stored and a storage area 2206 in which external character font information, form information, current print environment, and the like sent from the host computer 2201 are stored.

Storing pattern information, which is temporarily bitmapped into a character pattern, in the font cache area 2207 as a font cache in advance eliminates the necessity to decode the same character and bitmap it into a pattern every time the same character is printed. Hence, pattern information can be quickly bitmapped into a character pattern.

The CPU 2208 controls the overall control system of the LBP and controls the overall apparatus according to the control program (not shown) for the CPU 2208 which is stored in the ROM 2219. Reference numeral 2209 denotes a intermediate buffer in which an internal, intermediate data group generated on the basis of the input data 2218 is temporarily stored.

After 1-page data are completely received, converted into simpler intermediate data, and stored in the intermediate buffer 2209, the intermediate data are rendered several lines at a time by a renderer 2210 and output as print image to a band buffer 2211.

Note that the renderer 2210 can generate print bitmapped images with 8 bits/pixel for each of R, G, and B several lines at a time, and at the same time, can generate an attribute bitmapped image with 2 bits/pixel, which indicates whether each pixel is a character, graphic pattern, or image pixel.

The band buffer 2211 has a storage area in which at least 8-line R, G, and B print bitmapped images and attribute bitmapped images can be stored. At this time, the print bitmapped images and attribute bitmapped images are separately compressed by a compression unit 2212. When the R, G, and B print bitmapped images are to be compressed, attribute bitmapped images are input as compression parameters.

The images output to the band buffer 2211 are compressed in units of scan lines by the compression unit 2212 and then stored in a page memory 2213. After rendering and compression of 1-page intermediate data are completed and the resultant data are stored in the page memory 2213, the compressed data are read out and decompressed several lines at a time by a decompression unit 2214. At this time, pint bitmapped images and attribute bitmapped images are separately read out and decompressed.

The bitmapped images with 8 bits/pixel for each of R, G, and B as the decompressed data are converted into bitmapped images with 4 bits/pixel for each of Y, M, C, and K by a color conversion unit 2215. When each pixel of the pint bitmapped images is to be color-converted, color conversion methods are switched in accordance with the corresponding type of attribute bitmapped pixel. An output interface unit 2216 having output interface units for Y, M, C, and K converts the bitmapped images with 4 bits/pixel for each of Y, M, C, and K into a video signal and outputs it to a printer unit 2217. The printer unit 2217 is the printing mechanism portion of the page printer which prints image information based on the video signal from the output interface unit 2216.

As described above with reference to FIG. 18, in the LBP according to the fifth embodiment, to concurrently perform image forming/developing for M, C, Y, and K, the output interface unit 2216 is comprised of four output interface units, namely an M output interface unit, C output interface unit, Y output interface unit, and K output interface unit. These interface units independently acquire dot data from the color conversion unit 2215, converts the data into video signals, and outputs the signals to the laser drivers 2110, 2120, 2130, and 2140 in the respective planes.

Reference numeral 2220 denotes a nonvolatile memory generally formed by an EEPROM or the like and will be referred to as an NVRAM (Nonvolatile RAM) hereinafter. The NVRAM 2220 is used to store the panel set values designated by the operation panel 2151. Reference numeral 2221 denotes data to be transmitted from the LBP 2100 to the host computer 2201.

Note that the ROM 2215 includes control programs for analyzing data (drawing command) input from the host computer 2201, generating intermediate data, and controlling the printing mechanism body 2213, a color conversion table for conversion from an RGB color space to an MCYK color space, and the like.

The attribute bitmapped images generated by the renderer 2210 will be described next with reference to FIGS. 20A and 20B.

FIGS. 20A and 20B are views showing the detailed arrangement of an attribute bitmapped image in this embodiment.

FIG. 20A shows a print bitmapped image generated by the renderer 2210. FIG. 20B shows intermediate data stored in the intermediate buffer 2209. FIG. 20C shows an attribute bitmapped image generated by the renderer 2210.

First of all, it is checked whether an input drawing command is a character, graphic pattern, or image command, and a flag is set for each intermediate data stored in the intermediate buffer 2209 (FIG. 20B).

More specifically, the print bitmapped image in FIG. 20A contains a character 2100a, graphic pattern (circle) 2100b, and image 2100c. As intermediate data, Object 1 corresponding to the character 2100a contains an attribute (type): character (char), print position (x, y), font name (font-name), size (size), character code (code=a, b, c), and color (color). Object 2 corresponding to the graphic pattern 2100b contains an attribute (type): graphic pattern (graphic), print position (x, y), radius (r), shape (circle), and color. Object 3 corresponding to the image 2100c contains an attribute (type) image (image), print position (x, y), image width (w), image height (h), and pointer (pointer) for an image substance.

As described above, the intermediate data contain pieces of information about the shapes, colors, and print positions of the respective print objects.

When this intermediate data is printed by the renderer 2210, an attribute bitmapped image (FIG. 20C) is obtained, together with the print bitmapped image (FIG. 20A).

With regard to the attribute bitmapped image, each pixel of a character information area "0x1", graphic pattern information area "0x2", image information area "0x3", and remaining area "0x0" is expressed by 2-bit information.

According to the fifth embodiment, an ROI is determined and compression parameters are automatically set on the basis of the attribute bitmapped image data of input data, and hence an image can be effectively and efficiently printed while good image quality is maintained.

The contents of the attribute bitmapped image generated by the renderer 2210 may be the types of objects, e.g., a character, graphic pattern, and image.

In the fifth embodiment, the contents of the attribute bitmapped image generated by the renderer 2210 may be a type indicating the output quality of an area, i.e., representing a high-quality area for a high-quality output or a poor-quality area for poor-quality output.

In the compression unit 2212 (encoder), as a mask area of an ROI for the encoder, the OR of the character information bits and graphic pattern information bits of an attribute bitmapped image may be used.

In the fifth embodiment, the compression unit 2212 (encoder) may use the high-quality object information of an attribute bitmapped image as a mask area of an ROI.

The ROM 2215 stores control programs for analyzing data input from the host computer 2201, generating intermediate data, and controlling the printing mechanism body 2213, a color conversion table for conversion from an RGB color space to an MCYK color space, and the like. In the fifth embodiment, in particular, data in the form of print instructions such as character print instructions, various graphic pattern print instructions, image print instructions, color designation instructions, and the like are analyzed. Color area separation can also be added to this data analysis. By adding this image area separation, the present invention can be applied to even a case wherein bitmapped image data is input from the host computer 2201. That is, image area separation is performed for input bitmapped image data, and an attribute bitmapped image can be determined from the bitmapped image data having undergone image area separation. Alternatively, the bitmapped image data generated by the host computer 2201 may be subjected to image area separation on the host computer 2201, and the image area separation result and the bitmapped image data may be input.

As a mask area of an ROI, a predetermined attribute bitmapped image is fixed in the fifth emobdiment. However, the user may select a desired attribute bitmapped image as a mask area of an ROI by using, for example, the operation panel 2151.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiments.

In accordance with the embodiments as described above, a region of interest in image information having attribute information as bit information is decided using the bit information, thereby making it possible to obtain an image having a higher quality and a higher compression.

Further, by providing an attribute with a degree of priority and setting an image region that has an attribute with a high degree of priority as a region of interest, an image can be encoded without lowering the compression ratio of the overall image while suppressing a decline in the compression ratio of a region in which resolution is important.

In accordance with the present invention, as described above, an image region is designated based upon object information possessed by image information and the designated image region is subjected to encoding that is different from that of other regions, thereby making it possible to raise the encoding efficiency of the overall image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   discrimination means for discriminating a drawing object based upon object information corresponding to the drawing object;
   developing means for developing the drawing object and obtaining developed image data which represents a developed image;
   designation means for designating a region of the developed image based upon the object information corresponding to the drawing object that has been developed by said developing means;
   shift-up means for shifting up the bits of image data corresponding to the region of the developed image; and
   encoding means for entropy encoding the developed image data, in which the bits of the image data have been shifted up by said shift-up means.

2. The apparatus according to claim 1, further comprising combining means for combining drawing objects based on the corresponding object information when combination of drawing objects is commanded;
  wherein said developing means performs developing based upon the drawing objects combined by said combining means.

3. The apparatus according to claim 1, wherein said encoding means performs encoding while lowering a compression ratio of the developed image data corresponding to the region.

4. The apparatus according to claim 1, wherein said designation means designates the region in accordance with a degree of priority of object information that corresponds to the drawing object.

5. The apparatus according to claim 1, wherein the drawing object is described by a page description language.

6. An image processing method comprising:
  a discrimination step, of discriminating a drawing object based upon object information corresponding to the drawing object;
  a developing step, of developing the drawing object and obtaining developed image data which represents developed image;
  a designation step, of designating a region of the developed image based upon object information corresponding to the drawing object that has been developed in said developing step;
  a shift-up step, of shifting up the bits of image data corresponding to the region of the developed image; and
  an encoding step, of entropy encoding the developed image data, in which the bits of the image data have been shifted up by said shift-up step.

7. The method according to claim 6, further comprising a combining step of combining drawing objects based on the corresponding object information when combination of drawing objects is commanded
  wherein said developing step includes performing developing based upon the drawing objects combined in said combining step.

8. The method according to claim 6, wherein said encoding step includes performing encoding while lowering a compression ratio of the developed image data corresponding to the region.

9. The method according to claim 6, wherein said designation step includes designating the region in accordance with a degree of priority of object information that corresponds to a drawing object.

10. The method according to claim 6, wherein the drawing object is described by a page description language.

11. A computer-readable storage medium storing a program for executing an image processing method, the program comprising:
  a discrimination step, of discriminating a drawing object based upon object information corresponding to the drawing object;
  a developing step, of developing the drawing object and obtaining developed image data which represents a developed image;
  a designation step, of designating a region of the developed image based upon object information corresponding to the drawing object that has been developed in said developing step;
  a shift-up step, of shifting up the bits of image data corresponding to the region of the developed image; and
  an encoding step, of entropy encoding the developed image data, in which the bits of the image data have been shifted up in said shift-up step.

12. An image processing apparatus comprising:
  developing means for analyzing a plurality of commands representing a drawing object and developing bit-mapped image data for one page;
  transformation means for transforming the bit-mapped image data by using a wavelet transformation and generating transformed coefficients for the one page;
  designation means for designating a region of an image represented by the bit-mapped image data based upon an analysis result provided by said developing means;
  shift-up means for shifting up the bits of bit-mapped image data corresponding to the region of the image designated by said designation means; and
  entropy encoding means for entropy encoding the bit-mapped image data, in which the bits of bit-mapped image data corresponding to the region have been shifted up by said shift-up means.

13. The apparatus according to claim 12, further comprising:
  decode means for decoding code data encoded by said entropy encoding means and generating bit-mapped image data for one page; and
  print means for printing based on the bit-mapped image data.

14. The apparatus according to claim 12, wherein the command is described by using a page description language.

15. An image processing method comprising the steps of:
  analyzing a plurality of commands representing a drawing object and developing bit-mapped image data for one page;
  transforming the bit-mapped image data by using a wavelet transformation and generating transformed coefficients for the one page;
  designating a region of an image represented by the bit-mapped image data based upon an analysis result produced in said developing step;
  shifting up the bits of bit-mapped image data corresponding to the region of the image designated in said designation step; and
  entropy encoding the bit-mapped image data, in which the bits of bit-mapped image data corresponding to the region have been shifted up in said shifting up step.

16. A computer-readable memory storing program codes for controlling a printing apparatus for printing an image on a printing medium on the basis of input image data, comprising:
  a developing step module, of analyzing a plurality of commands representing a drawing object and developing bit-mapped image data for one page;
  a transforming step module, of transforming the bit-mapped image data by using a wavelet transformation and generating transformed coefficients for the one page;
  a designation step module, of designating a region of an image represented by the bit-mapped image data based upon an analysis result in said developing step module;
  a bit shift-up step module, of shifting up the bits of bit-mapped image data corresponding to the region of the image designated in said designation step module; and
  an entropy encoding step module, of entropy encoding the bit-mapped image data, in which the bits of bit-mapped image data corresponding to the region have been shifted up in said bit shift-up step module.

* * * * *

UNITED STATES PATENT AND TRADEMARK OFFICE
CERTIFICATE OF CORRECTION

PATENT NO. : 6,853,466 B1
DATED : February 8, 2005
INVENTOR(S) : Takuto Harada et al.

It is certified that error appears in the above-identified patent and that said Letters Patent is hereby corrected as shown below:

Title page,
Item [57], ABSTRACT,
Line 15, "ratio," should read -- ratios, --.

Drawings,
SHEET 19, Figure 19, "PATTER" should read -- PATTERN --.

Column 2,
Lines 6 and 21, "image:" should read -- image; --.

Column 3,
Line 32, "title" should read -- tile --; and
Line 34, "in" should be deleted and "sturucture" should read -- structure --.

Column 4,
Line 34, "quantized" should read -- quantized by --.

Column 5,
Line 56, "in" should read -- is --; and
Line 60, "a" should read -- as --.

Column 6,
Line 24, "indicates" should be deleted.

Column 8,
Line 31, "c'=0 q=0" should read -- c'=0; q=0 --.

Column 9,
Line 38, "The" (second occurrence) should read -- the --.

Column 11,
Line 9, "The" should read -- the --; and
Lines 60 and 66, "indicate" should read -- indicates --.

Column 12,
Lines 4, 16, 22 and 28, "indicate" should read -- indicates --; and
Line 7, "SI a DI" should read -- SI $\alpha$ DI --.

UNITED STATES PATENT AND TRADEMARK OFFICE
CERTIFICATE OF CORRECTION

PATENT NO. : 6,853,466 B1
DATED : February 8, 2005
INVENTOR(S) : Takuto Harado et al.

It is certified that error appears in the above-identified patent and that said Letters Patent is hereby corrected as shown below:

Column 14,
Line 13, "in" should be deleted; and
Line 33, "form" should read -- from --.

Column 16,
Lines 16 and 20, "pint" should read -- print --.

Column 17,
Line 8, "(type)" should read -- (type): --; and
Line 60, "emobdiment." should read -- embodiment --.

Column 19,
Line 2, "commanded;" should read -- commanded, --;
Line 20, "developed" should read -- a developed --;
Line 35, "commanded" should read -- commanded, --; and
Line 45, "a" should read -- the --.

Signed and Sealed this

Sixth Day of September, 2005

JON W. DUDAS
*Director of the United States Patent and Trademark Office*